United States Patent
Humphrey

(10) Patent No.: US 6,449,261 B1
(45) Date of Patent: Sep. 10, 2002

(54) TIME DIVISION DUPLEXED MULTICARRIER TRANSMISSION

(75) Inventor: Leslie Derek Humphrey, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/117,907
(22) PCT Filed: Mar. 14, 1997
(86) PCT No.: PCT/GB97/00706
§ 371 (c)(1), (2), (4) Date: Aug. 10, 1998
(87) PCT Pub. No.: WO97/35399
PCT Pub. Date: Sep. 25, 1997

(30) Foreign Application Priority Data

Mar. 16, 1996 (GB) ............................................. 9605564

(51) Int. Cl.⁷ ............................. H04B 1/10; H04J 1/00; H04J 3/00; H04K 1/10; H04L 5/14
(52) U.S. Cl. ....................................... 370/280; 370/294
(58) Field of Search ................................ 370/280, 294, 370/480, 482, 485, 493, 497; 375/350, 260

(56) References Cited

U.S. PATENT DOCUMENTS

| | | | |
|---|---|---|---|
| 5,410,343 A | 4/1995 | Coddington et al. | 348/7 |
| 5,742,527 A * | 4/1998 | Rybicki et al. | 370/484 |
| 5,838,667 A * | 11/1998 | Bingham et al. | 370/294 |

FOREIGN PATENT DOCUMENTS

| | | | | |
|---|---|---|---|---|
| EP | 0653859 A1 | 5/1995 | | H04L/5/14 |
| WO | WO 95/28773 | 10/1995 | | H04B/1/06 |
| WO | WO 97/01900 | 1/1997 | | H04L/5/14 |
| WO | WO 97/03506 | 1/1997 | | H04L/5/02 |
| WO | WO 95/34149 | 12/1997 | | H04L/5/06 |

OTHER PUBLICATIONS

Chow, et al., "Performance Evaluation of a Multichannel Transceiver System for ADSL and VHDSL Services," IEEE Journal on Selected Areas in Communications, vol. 9, No. 6, Aug. 1991, pp. 909–919.

* cited by examiner

Primary Examiner—Huy D. Vu
Assistant Examiner—Toan Nguyen
(74) Attorney, Agent, or Firm—Lee, Mann, Smith, McWilliams, Sweeney & Ohlson

(57) ABSTRACT

A digital transmission system comprises a plurality of wire, sets (151, 155), such as twisted-pair wires for delivering services to subscribers (110, 120, 130, 140). A first wire set (151) carries a time-division duplexed multitone signal VDSL. The system is arranged to individually select the transmitted spectra of the upstream and downstream portions of the duplexed signal so as to minimise cross-talk interference with further signals ADSL, HDSL carried by other wire sets (155). In use, the transmitted spectra of the upstream and downstream portions of the duplexed signal may differ in bandwidth.

14 Claims, 4 Drawing Sheets

TIME DIVISION DUPLEXED MULTICARRIER TRANSMISSION

TECHNICAL FIELD

This invention relates to telecommunications systems which use digital modulation techniques to transport signals.

BACKGROUND OF THE INVENTION

There is an increasing demand for supplying broadband telecommunications services such as high bit-rate data and video-on-demand services to subscribers. Traditionally the subscriber loop between a subscriber and their local telephone exchange has been a twisted-pair cable, with higher capacity trunks transporting signals between exchanges and connecting exchanges to service providers. When it is required to deliver broadband services it can be seen that the subscriber loop is the weak link in the delivery chain. Replacing twisted-pair cables by higher-capacity optical fibre or coaxial cables provides the required improvement in the subscriber loop capacity but at a prohibitive cost. However, it has been found that by using digital modulation techniques such as Discrete Multitone Modulation (DMT) together with digital signal processing techniques at the transmitter and receiver, high bit-rates can be successfully carried over existing twisted-pair subscriber loops.

Several digital transmission schemes are already in use. Asymmetric Digital Subscriber Line (ADSL) provides a high-capacity channel in the downstream (service provider to subscriber) direction and a lower capacity upstream control channel in addition to a conventional analogue voice channel. High bit-rate Digital Subscriber Line (HDSL) provides a symmetrical high-capacity link in both the upstream and downstream directions over one or two wire pairs. Both of these schemes use discrete multitone modulation.

Further research has shown that even higher bit-rates can be carried over the subscriber loop. Increased bit-rates allows higher-quality video services or an increased selection of services to be provided. Very high-speed Digital Subscriber Loop (VDSL) is a proposed scheme, also using DMT techniques, with an increased capacity of around 25 Mbit/s. VDSL occupies the spectral band up to 10 MHz on a subscriber loop.

An article entitled "Performance Evaluation of a Multi-channel Transceiver System for ADSL and VHDSL Services" by Peter Chow, Jerry Tu and John Cioffi, published in IEEE Journal on Selected Areas in Communications, Vol 9, No 6, August 1991, studies the performance of ADSL and VHDSL services including the effects of near-end crosstalk (NEXT) and far-end crosstalk (FEXT).

International Patent Application WO95/28773 (Amati) describes an ADSL compatible discrete multi-tone transmission scheme that can be used in the presence of crosstalk noise.

It has been proposed that VDSL use time-division multiplexing (TDM) techniques with duplexing achieved by transmitting in the upstream and downstream directions in separate time slots. VDSL generally operates over shorter distances than ADSL. VDSL signals may be coupled on to the subscriber loop at a street cabinet part-way between an exchange and a subscriber.

TDM schemes which use duplexing are not a good neighbour for other non-TDM schemes. This poses a problem of compatibility with existing and possible future schemes when duplexed TDM signals are carried over cables alongside wires carrying signals which are modulated according to other schemes.

SUMMARY OF THE INVENTION

The invention seeks to provide an improved digital transmission system.

According to one aspect of the present invention there is provided a method of operating a digital transmission system, the method comprising carrying on a first wire set a time-division duplexed multitone signal, and individually selecting the transmitted spectra of the upstream and downstream portions of the duplexed signal whereby to minimise cross-talk interference with further signals carried by other wire sets.

Preferably, in use, the transmitted spectra of the upstream and downstream portions of the duplexed signal differ in bandwidth.

The spectrum of the upstream portion of the duplexed signal may be selected so as to avoid the frequency bands used by downstream portions of the further signals carried by the other wire sets whereby to minimise near end cross-talk interference (NEXT) and the spectrum of the downstream portion of the duplexed signal may be selected so as to occupy substantially the full bandwidth of the wire set.

The upstream portion of the duplexed signal may occupy the bandwidth above substantially 1.1 MHz of the wire set to minimise NEXT with downstream ADSL signals carried by the other wire sets.

Preferably a multitone transmitter/receiver pair couples to each end of the first wire set, the step of individually selecting the transmitted spectra of the upstream and downstream portions of the duplexed signal comprising selectively using multitone sub-channels in the transmitter and the receiver of each pair.

Another aspect of the invention provides a digital transmission system comprising a plurality of wire sets, a first of the wire sets carrying a time-division duplexed multitone signal, the system being arranged to individually select the transmitted spectra of the upstream and downstream portions of the duplexed signal whereby to minimise cross-talk interference with further signals carried by other wire sets.

Preferably a multitone transmitter/receiver pair couples to each end of the first wire set, each pair having control means which individually controls selective use of multitone sub-channels in the transmitter and receiver.

Preferably each transmitter/receiver pair has a first filter at the output of the transmitter and a second filter at the input of the receiver. This provides additional shaping of the downstream and upstream spectra and minimises the effects of leakage into or from adjacent multitone sub-channels.

A further aspect of the invention provides a multitone transmitter/receiver pair for use at one end of a digital transmission system, which pair is arranged to transmit and receive a time-division duplexed multitone signal over a wire set, the pair having control means which individually controls selective use of multitone sub-channels in the transmitter and receiver whereby to individually select the transmitted spectra of the upstream and downstream portions of the duplexed signal to minimise cross-talk interference with further signals carried by other wire sets in the system.

BRIEF DESCRIPTION OF THE DRAWINGS

In order to enable a greater understanding of the invention to be attained, and to show by way of example how it may be carried into effect reference will be made to the figures as shown in the accompanying drawings sheets, wherein.

DESCRIPTION OF PREFERRED EMBODIMENTS

Figure 1:
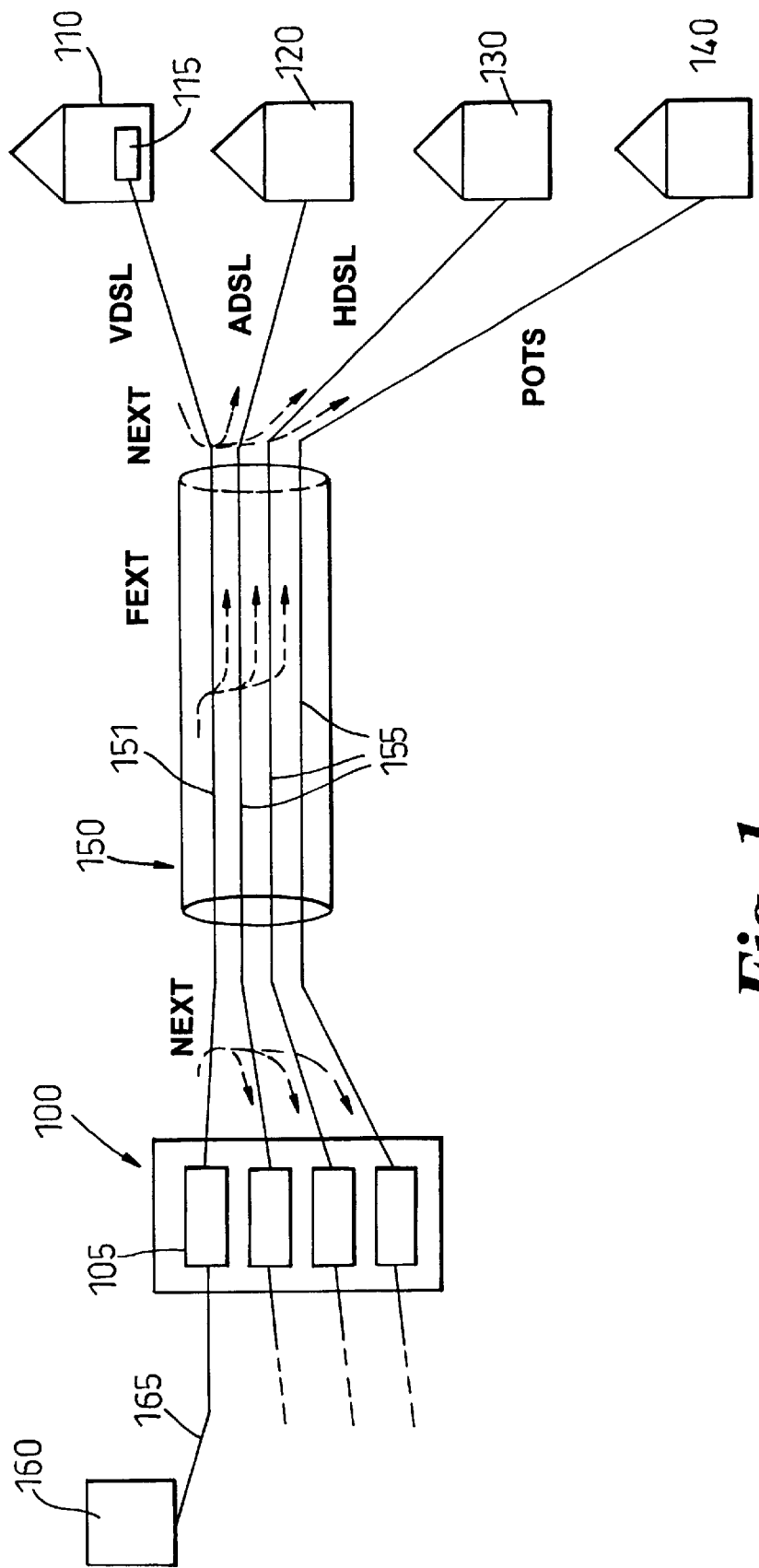
FIG. 1 shows a cabled transmission system.

FIG. 1 shows a cabled transmission system linking an exchange 100 to a number of subscribers 110, 120, 130, 140. Wire sets 151,155, each dedicated to a particular one of the subscribers, extend from exchange 100 to the subscribers. Typically the wire sets are unshielded twisted-pair wires.

One of the primary limitations in cabled transmission systems is cross-talk. Signals passing along a first cable will leak to a certain extent into other cables lying alongside that first cable. The two main forms of cross-talk are near-end cross-talk (NEXT) and far-end cross-talk (FEXT).

NEXT occurs where a high-level transmitted signal is injected into a first cable, leaks into an adjacent cable and is picked-up at the adjacent cable's receiver located at the end of the cable which is local to the source transmitter. At low frequencies NEXT is tolerable, but at higher frequencies it becomes the dominant source of interference, severely restricting the performance of transmission systems. NEXT occurs at both ends of a cabled system, as shown in FIG. 1.

FEXT occurs where a transmitted signal, injected into a first cable, leaks into an adjacent cable and is picked-up at the adjacent cable's receiver located remote from the source transmitter. The level of FEXT increases with the length of a cable run and can therefore be seen to limit the reach of a system.

For a major part of the run the wire sets will form part of a cable bundle 150. It is the close physical spacing of wire sets 151, 155 in cable 150 and along this first part of the path between exchange 100 and the subscribers which causes the most significant cross-talk problems. While precautions can be taken to minimise cross-talk, such as by randomly rearranging the order of wire sets along the length of cable 150, cross-talk cannot be eliminated. A path between exchange 100 and s subscriber premises may be formed by several bundles 150 which are joined by cross-connection points.

FIG. 1 shows a simplified system where one subscriber transmits and receives signals which are modulated according to each of the different schemes. Thus subscriber 110 has signals which are modulated according to a VDSL scheme, subscriber 120 has signals which are modulated according to an ADSL scheme, subscriber 130 has signals which are modulated according to an HDSL scheme and subscriber 140 has a standard POTS (Plain Old Telephone Service) service. A typical scenario would see varying numbers of subscribers using each of these different schemes.

Exchange 100 and each of the subscribers have transmitting and receiving equipment to support the schemes. As an example, transmitting/receiving equipment 105 is shown at exchange 100, and complementary transmitting/receiving equipment 115 is shown at the premises of subscriber 110. A high-capacity link, such as an optical fibre cable 165, couples transmitting/receiving equipment 105 at exchange 100 to a service provider 160. Transmitting/receiving equipment 105 s may alternatively be located at a street cabinet at a cross-connect point which is part-way between exchange 100 and subscriber premises.

Figure 2:
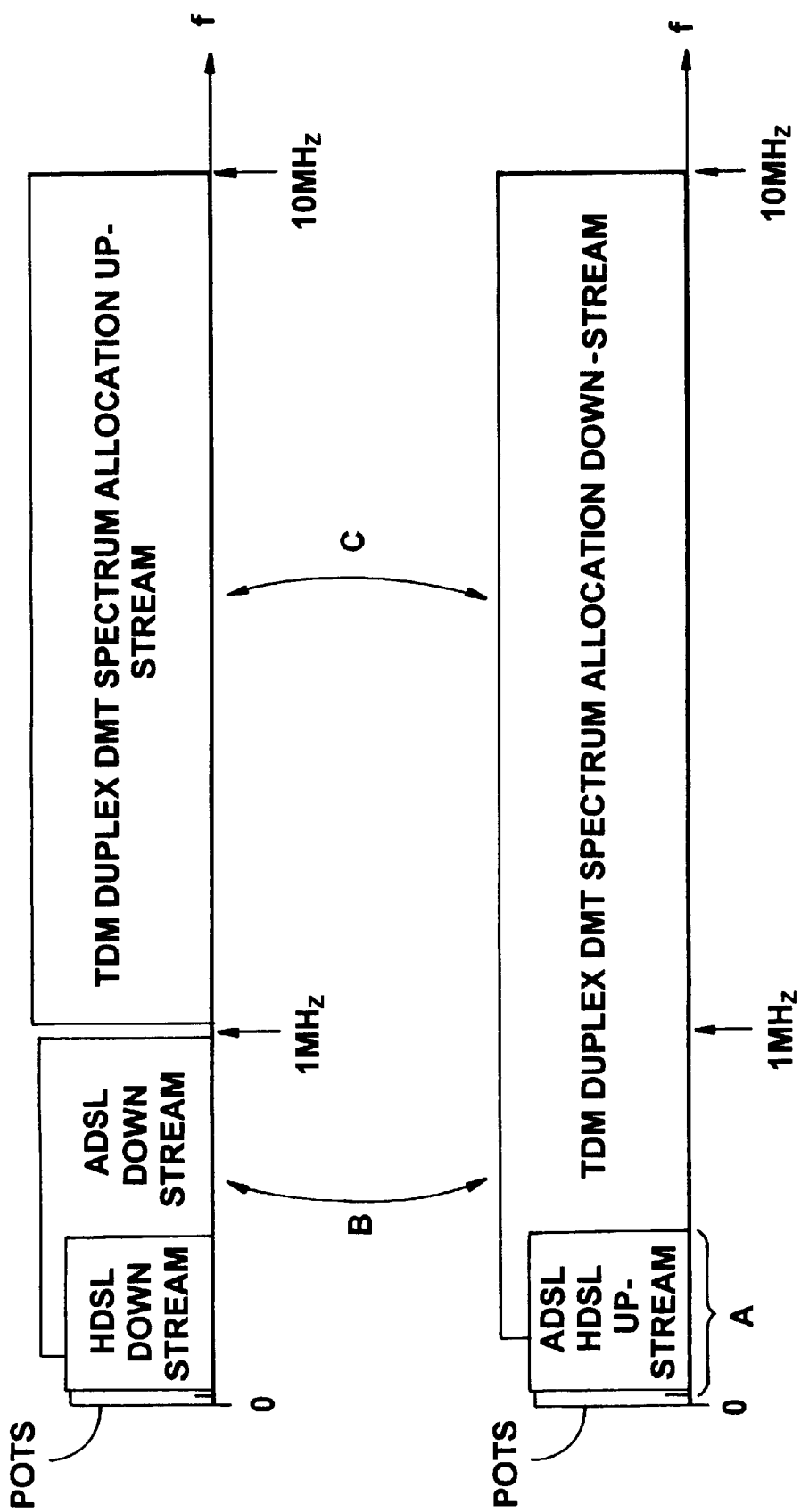
FIG. 2 shows the allocation of bandwidth to different transmission schemes which are used in the system of FIG. 1.

FIG. 2 shows how each of the different schemes shown in FIG. 1 make use of the available bandwidth on the wire sets. For clarity, the schemes are show n o n two graphs with a non-linear frequency scale. Each of the schemes will usually be carried over a separate wire set, as shown in FIG. 1, but here are shown together so as to consider the likely effects of cross-talk between the schemes.

POTS occupies a narrow bandwidth from several hundred Hz to around 4 kHz to carry a duplex analogue telephone signal. HDSL is a symmetrical scheme, with upstream and downstream traffic typically occupying the same bandwidth—usually up to around 200 kHz. ADSL is an asymmetrical scheme with an upstream signal occupying a band up to around 200 kHz and a downstream signal occupying a much broader band from around 200 kHz to 1.1 MHz. Frequency separation of the upstream and downstream signals minimises NEXT.

The bandwidth of the upstream and downstream signals which form the duplex VDSL scheme are individually chosen so as to minimise interference with signals which are modulated according to ADSL and HDSL schemes. Preferably the upstream VDSL signal occupies the bandwidth above around 1.1 MHz. While this sacrifices some upstream capacity, using separate frequency bands for the upstream VDSL and downstream ADSUHDSL ensures that there is no NEXT between the schemes.

The downstream VDSL signal occupies almost the full bandwidth of the wire set up to 10 MHz in order to maximise downstream capacity. Overlap between downstream VDSL and upstream ADSUHDSL (marked A in the figure) is limited to the lower frequency band where NEXT can be tolerated. Downstream VDSL and downstream ADSL share the same frequency band (marked B) but the cross-talk effects are limited to FEXT at the lower end of the frequency band. The other potential conflict is between upstream and downstream VDSL (marked C), but time-division separation of the signals in the upstream and downstream directions prevents this. Furthermore, all VDSL sources are synchronised such that they are all transmitting at the same time or receiving at the same time so as to minimise NEXT between different VDSL wire sets. It can thus be seen that cross-talk interference is minimised between the schemes.

Figure 3:
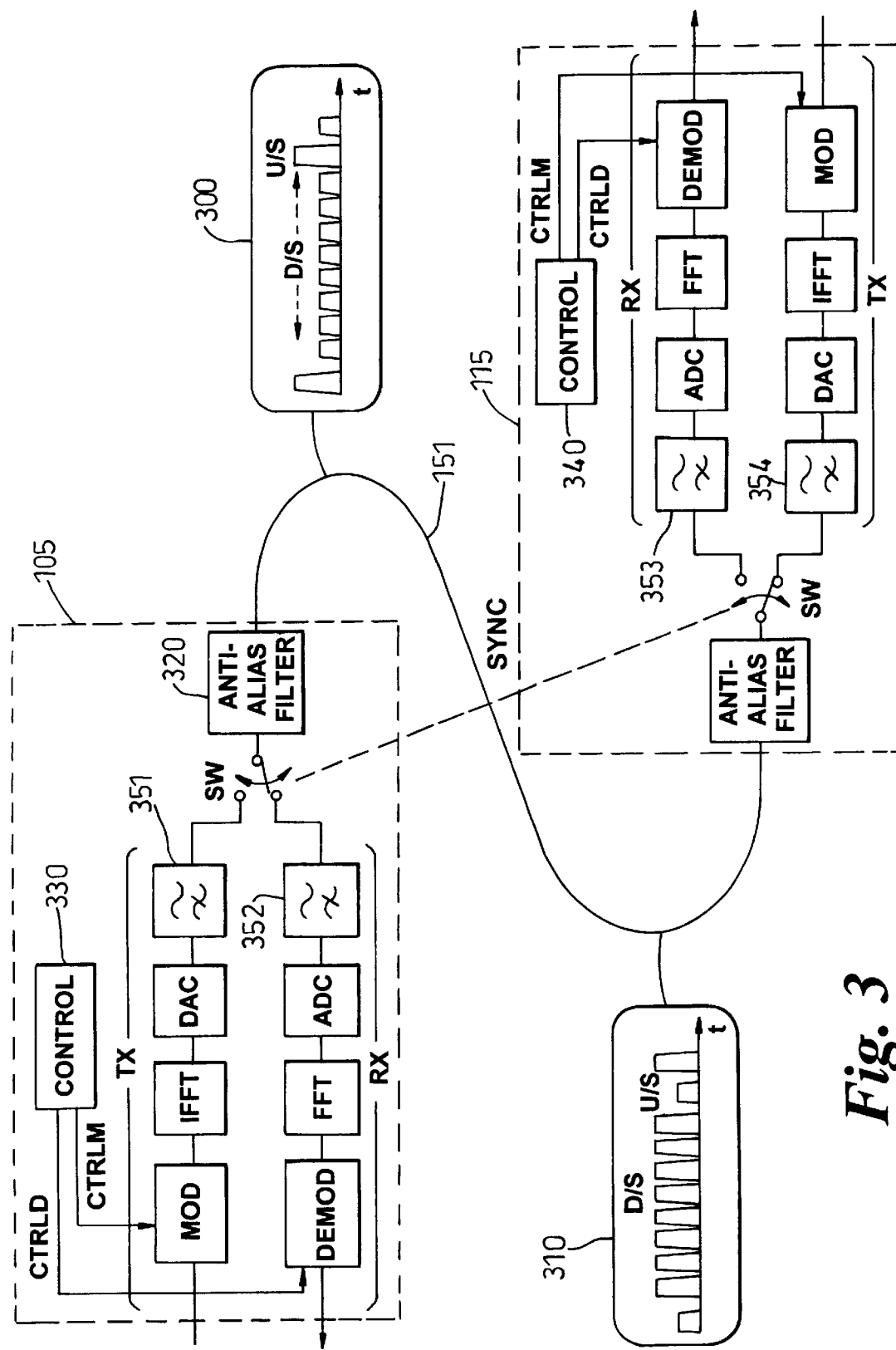
FIG. 3 is a block diagram of equipment which performs duplex transmission.

FIG. 3 shows transmitter/receiver equipment for performing duplex transmission of a multitone signal. Boxes 105 and 115 show the transmitter/receiver equipment of FIG. 1 in more detail, linked by a wire set 151. Equipment 105 and 115 each includes a transmit chain TX and a receive chain RX which are connected to transmission channel 151 by a switch SW as required. Switching between transmit and receive functions at equipments 105 and 115 at opposite ends of wire set 151 is synchronised as is well-known in TDM duplex systems. Details 300 and 310 show an exemplary form of time duplexed transmission at two points along the channel, where eight downstream symbols and one upstream symbol form a frame. Other numbers of symbols in each direction could be used. A common anti-alias filter 320 can be shared by the transmit and receive paths, as shown in FIG. 3, or separate anti-alias filters can be inserted into the transmit and receive chains.

Equipments 105, 115 each include a control block 330, 340. Each control block outputs a first control signal CTRLM to the modulator MOD and a second control signal CTRLD to the demodulator DEMOD. The control signal CTRLM fed to the modulator determines (i) the multitone sub-channels which are to be used, and (ii) the number of bits which are allocated to each of the multitone sub-channels. Similarly, the control signal CTRLD informs the demodulator of the multitone sub-channels which are in use and the number of bits which are allocated to each of those multitone sub-channels.

For transmission in the downstream direction, modulator (MOD) in equipment 105 at a first end of wire set 151 and demodulator (DEMOD) in equipment 115 at the other end of the wire set are controlled so as to use corresponding multitone sub-channels. The selection of multitone sub-channels for use in the upstream direction is independent of that used in the downstream direction. Modulator (MOD) in equipment 115 and demodulator (DEMOD) in equipment 105 are also controlled so as to use corresponding multitone sub-channels.

The particular selection of sub-channels which is used is dependent on two constraints. Certain sub-channels may be forbidden a-priori, such as those used by downstream ADSL. The transmitter which transmits, and the receiver which receives the upstream portion of the duplex signal are both forbidden from using these channels as they are known to cause excessive cross-talk interference. The control blocks 330, 340 in equipments 105, 115 may store these forbidden channels in a permanent or programmable memory.

Other sub-channels may be not be used when it is discovered at start-up that they have insufficient signal-to-noise ratio (SNR) to support reliable transmission of data. During the start-up process the SNR predicted for a particular sub-channel is used to allocate a number of bits to be carried on that sub-channel. This is not known a-priori, but is based on frequency dependant SNR measurements, and may also be informed by knowledge of the worst case interference regime. During the start-up process, the allocation of the number of bits per sub-channel which the receiver is to use is made known by the transmitter.

Figure 4:
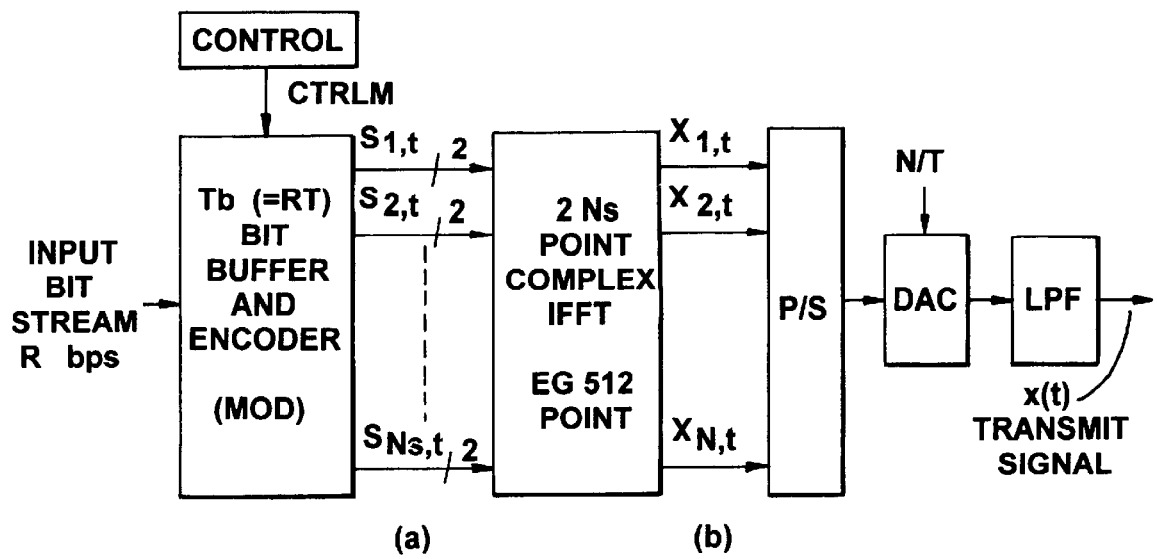
FIG. 4 is a more detailed diagram of a DMT transmitter used in the equipment of FIG. 3.

FIG. 4 shows a typical transmitter chain in more detail. It comprises an input bit stream buffer and encoder, an inverse fast Fourier transform unit, a serial formatting unit (P/S), a digital-to-analogue converter (DAC) and an output low pass filter (LPF). In such an arrangement, an input bit stream of data rate R bps is buffered into blocks of $T_b$ bits by the buffer, where $T_b$ is the total number of input bits per modulator symbol. $T_b$ is given by the product of the data rate and the symbol period (T) of the DMT modulator. These $T_b$ bits are divided amongst the sub-channels, each having $b_i$ bits.

These $b_i$ bits for each of the $N_s$ sub-channels are translated in the DMT encoder into a complex sub-symbol $S_i$, for each sub-channel. Each subchannel has $2^{bi}$ possible QAM symbol states. The $2 N_s$ point IFFT unit combines the Ns subsymbols into a set of N real-valued time domain samples, $X_{n, t}$; where n=1 . . . N, and t represents the sample time. These N samples are successively applied (in serial format) to a digital-to-analogue converter, DAC, which samples at a rate N/T—which is the sampling rate of the DMT modulator—to create a symbol for the DMT modulator. The output of the DAC is a continuous-time modulated signal x(t) which is a succession of DMT symbols each formed from N time domain samples.

The following key relates to FIG. 4 of the drawings:

| | |
|---|---|
| (a) | Ns QAM symbols-drive only half the IFFT inputs e.g. 256 symbols |
| (b) | N time domain samples-uses only real output of samples e.g. 512 samples. |
| P/S | Parallel to serial converter time index for each IFFT cycle |
| N | = 2Ns |
| T | Symbol period of DMT modulator |
| NFF | Sampling rate of DMT modulator |

Figure 5:
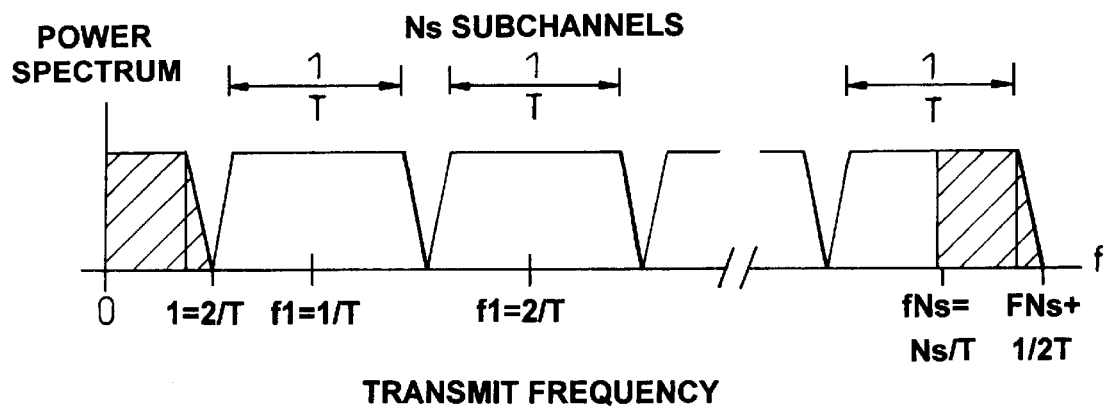
FIG. 5 shows the output spectrum of a DMT transmitter.

An idealised output spectrum of the DMT transmitter of FIG. 4 is shown in FIG. 5. The sub-channels are centred on $F_i$=i/T.

In practice, some energy leaks from sub-channels according to the relationship $sin(f-F_C)/(f-F_C)$, where $F_C$ is the DMT sub-channel frequency in question. Use of an improvement detailed in International Patent Application No. PCT/GB96/02008 can reduce this leakage.

A further way of reducing the effects of the leakage of energy from sub-channels is to use additional filters in the transmitter and receiver. Referring again to FIG. 3, filter 351 is coupled to the DAC port of the transmitter, and filter 352 is coupled to the ADC port of the receiver. Similar filters 353, 354 are shown in equipment 115 at the other end of wire set 151. These filters additionally shape the bandwidth of the transmitter and receiver. The transmitter filters 351, 354 minimise leakage of the transmitted signal into adjacent bands. The receiver filters 352, 353 reduce the effects of leakage of signals from adjacent bands into the wanted band.

Preferably the power spectral densities of the duplex VDSL system and ADSL schemes are made equivalent.

What is claim is:

1. A method of operating a digital transmission system comprising a plurality of wire sets, the method comprising carrying on a first of the wire sets a time-division duplexed multitone signal, and individually selecting the transmitted spectra of the upstream and downstream portions of the duplexed signal whereby to minimise cross-talk interference with further signals carried by other wire sets of the plurality of wiresets by ensuring frequency separation of upstream TDD signals from downstream signals of frequency separation of upstream TDD signals from downstream signals of the further signals while permitting frequency overlap of downstream TDD signals with the further signals.

2. A method of operating a digital transmission system according to claim 1 wherein the transmitted spectra of the upstream and downstream portions of the duplexed signal differ in bandwidth.

3. A method according to claim 1 wherein the transmitted spectra of the upstream and downstream portions of the duplexed signal are overlapping.

4. A method of operating a digital transmission system according to claim 1 wherein the spectrum of the upstream portion of the duplexed signal is selected so as to avoid the frequency bands used by downstream portions of the further signals carried by the other wire sets whereby to minimise near end cross-talk interference (NEXT) and the spectrum of the downstream portion of the duplexed signal is selected so as to occupy substantially the full permitted bandwidth of the wire set.

5. A method of operating a digital transmission system according to claim 4 wherein the upstream portion of the duplexed signal occupies the bandwidth above substantially 1.1 MHz of the wire set to minimise NEXT with downstream ADSL signals carried by the other wire sets.

6. A method of operating a digital transmission system according to claim 1 wherein a multitone transmitter/receiver pair couples to each end of the first wire set, the step of individually selecting the transmitted spectra of the upstream and downstream portions of the duplexed signal comprising selectively using multitone sub-channels in the transmitter and the receiver of each pair.

7. A method according to claim 6 wherein the step of individually selecting the transmitted spectra comprises referring to a store of forbidden channels stored in a memory at the transmitter/receiver.

8. A method according to claim 6 wherein the step of individually selecting the transmitted spectra is based on frequency dependent signal-to-noise ratio (SNR) measurements.

9. A digital transmission system comprising a plurality of wire sets, a first of the wire sets carrying a time-division duplexed multitone signal, the system being arranged to individually select the transmitted spectra of the upstream and downstream portions of the duplexed signal whereby to minimise cross-talk interference with further signals carried by other wire sets of the plurality of wiresets by ensuring frequency separation of upstream TDD signals from downstream signals of the further signals while permitting frequency overlap of downstream TDD signals with the further signals.

10. A digital transmission system according to claim 9 wherein a multitone transmitter/receiver pair couples to each end of the first wire set, each pair having control means which individually controls selective use of multitone sub-channels in the transmitter and receiver.

11. A digital transmission system according to claim 10 wherein each transmitter/receiver pair has a first filter at the output of the transmitter and a second filter at the input of the receiver.

12. A digital transmission system according to claim 9 wherein the wire sets comprise twisted-pair wires.

13. A multitone transmitter/receiver pair for use at one end of a digital transmission system comprising a plurality of wire sets, which pair is arranged to transmit and receive a time-division duplexed multitone signal over a first of the wire sets, the pair having control means which individually controls selective use of multitone sub-channels in the transmitter and receiver whereby to individually select the transmitted spectra of the upstream and downstream portions of the duplexed signal to minimise cross-talk interference with further signals carried by other wire sets of the plurality of wiresets by ensuring frequency separation of upstream TDD signals from downstream signals of the further signals while permitting frequency overlap of downstream TDD signals with the further signals.

14. A telecommunications network for delivery of broadband services to subscribers over twisted-pair subscriber loops incorporating a system according to claim 9.

* * * * *